Oct. 21, 1924.  
G. H. MAXWELL  
1,512,229

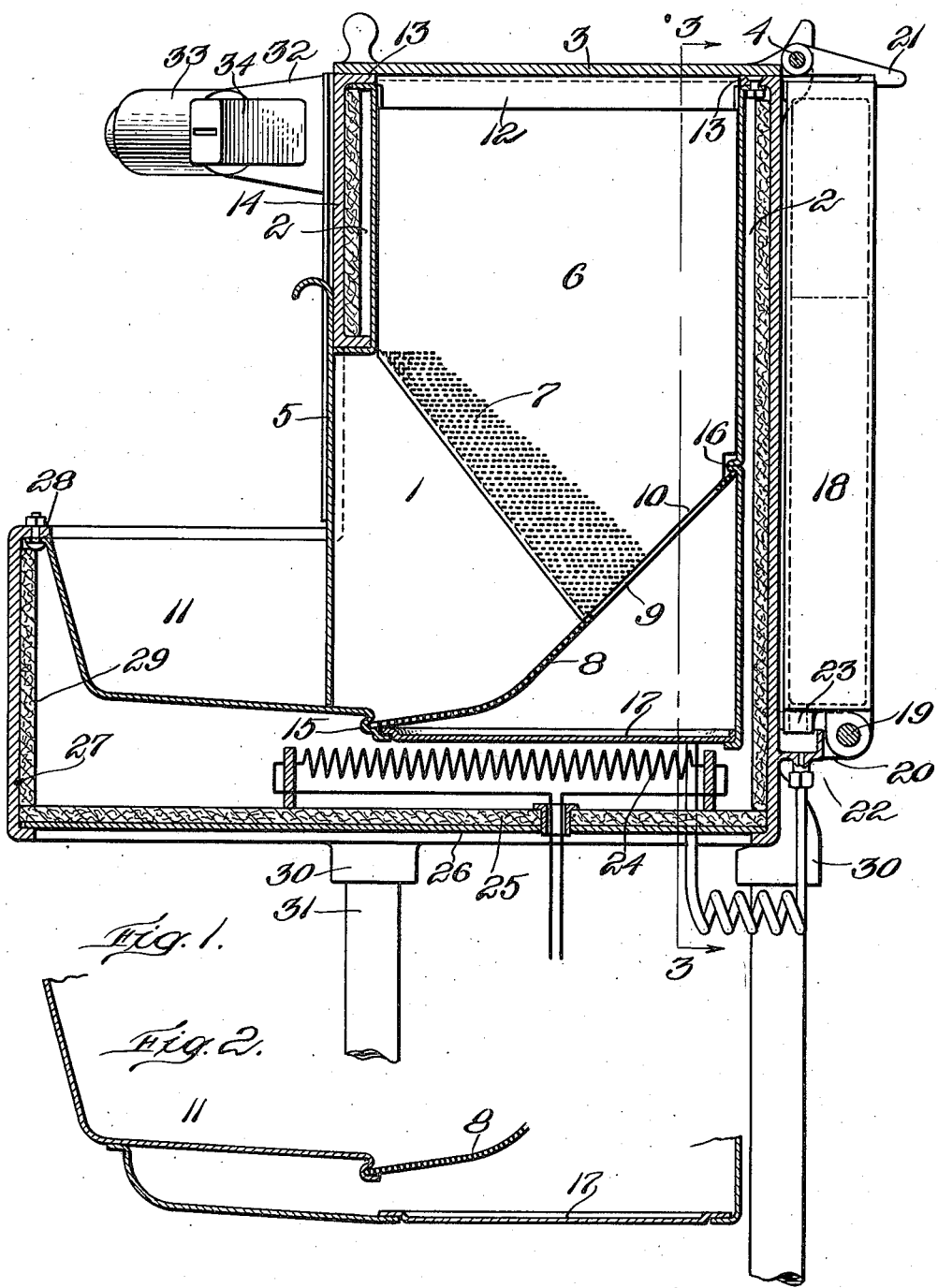

SHOE BOTTOM FILLING MACHINE

Original Filed Sept. 14, 1921  3 Sheets-Sheet 2

Inventor:
George H. Maxwell

Patented Oct. 21, 1924.

1,512,229

UNITED STATES PATENT OFFICE.

GEORGE H. MAXWELL, OF PHOENIX, ARIZONA.

SHOE-BOTTOM-FILLING MACHINE.

Application filed September 14, 1921, Serial No. 500,710. Renewed May 13, 1922. Serial No. 560,800.

*To all whom it may concern:*

Be it known that I, GEORGE H. MAXWELL, a citizen of the United States, and resident of Phoenix, Arizona, have invented an Improvement in Shoe-Bottom-Filling Machines, of which the following description, in connection with the accompanying drawings, is a specification, like letters on the drawings representing like parts.

The kind of filler patented in Patent No. 861,555 July 30, 1907, has always been put on the market in the form of loaves as shown in the drawing of Patent No. 832,002, Sept. 25, 1906, and used as described in Patent No. 808,224, Dec. 26, 1905, (further set forth in Patent No. 808,227, Dec. 26, 1905). All of said patents and their mutual relations in constituting a new system are further set forth in vol. 252, Federal Reporter, pages 148 to 176. My present invention aims to speed up the process, shorten the time required to get the filler ready for the shoe-operative to apply to the shoe-bottom, hasten the even dissemination of a softening heat throughout the mass of the filler, and introduce a film of moisture in and among the granules and binder so as to lighten the labor element in the process. The slowness or delay which has always attended the use of this kind of filler has been due to three conditions, viz., first, the predominating cork content makes the filler a heat insulator or impervious to quick penetration by heat, second, the loaf form necessitates considerable compression in making the loaf, so that the heat can attack the outside only, penetrating thence inwardly, and that slowly, because of the aforesaid character of the filler and the dense mass form of the package and, third, the character of the cork and the binder necessitates a low heat, as the cork would char and lose its life or resiliency under a continued high heat.

I secure speed and efficiency by eliminating the second condition above, using the filler from the bottom and applying the initial high heat at the bottom, loosening the filler mass by means of moisture as well as heat, conveying said heat by chimney-like flues or radiators or other equivalent mechanical means throughout the fragmentary mass, and enveloping the whole in heat and preferably in said moist heat. In fact, my invention may be characterized as residing primarily in providing mechanism for enveloping both the mass and also the segregated or subdivided portions and particles thereof with said heat and said moisture. This process or method and the mechanical means for carrying it into practice constitute my invention. According to my present invention, I provide the filler in a small, fragmentary, non-compressed and open condition, and so construct the heating machine that it receives this filler in segregated masses, being provided with heat flues or radiators which preferably extend into or within the general body or mass of the filler and which convey the heat directly into contact with the filler here and there within and throughout the mass and I employ steam or hot vapor for driving the heat rapidly and thoroughly through these segregated masses of filler, preferably providing a foraminous bottom beneath the filler body and foraminous walls for said flues or radiators (at least in the front lower portions of said flues or radiators) through the small holes or openings of which the bottom and walls the steam and heat may freely flow up and out into the filler and among its open fragments. Not only is the filler itself made preferably in a fragmentary, non-compressed and open form and condition, but the machine for handling it maintains it thus open and non-compressed and is so constructed and arranged that the contained mass of filler is held apart or parted at a plurality of places, providing a plurality of openings in the filler extending vertically for receiving simultaneously throughout their vertical walls or areas a melting heat, so that thereby this refractory filler which is normally slowly penetrative by heat and liable to burn at high heat is nevertheless rapidly and safely melted in mass. This parted openness and the delivery of melting heat thereinto, together with the permeable or loose character of the mass and so maintaining the same to delivery, constitutes one of the chief distinguishing features of my invention. In order that there shall be a steady supply of wet 'steam or hot moisture I provide a source of steam or hot vapor for delivery into and up through the mass of more or less open filler, preferably by locating beneath said bottom a shallow pan or water-receptacle and a supply, preferably fed automatically, of water, so that a shallow or thin sheet of water is present always just above the heater (electric, steam or gas) for almost instant and continuous conversion into steam. This pan or water receptacle opens freely upward into the filler through the bottom but is closed or sealed against the escape of the steam outside and hence the steam of necessity drives itself and the heat forcibly into and throughout the filler, thereby rapidly softening and lubricating the filler. A delivery basin or trough is provided to receive the heated and semiflowing filler at the front of the apparatus and this is maintained properly hot by being surrounded wholly or partly by an extension of the steam pan and by the dry-heat container in which is mounted the electric heating unit or the steam coil or gas jet which furnishes the heat for the filler. I concentrate the heat-attack all over the bottom end of the mass of filler by means of simultaneously delivered streams or enveloping portions of steam which combines with the radiant heat of the bottom so that the latter cannot burn the filler and so that the filler particles are compelled to keep loose and open and fall or tend to flow forward by disintegration into the work basin. This permits the use of high heat without danger, effects a speed of result before impossible with this refractory material and economizes the heat and effort by the concentration and the progressive action at the bottom as the filler is used. The steam is driven readily into the open and opening chunks and particles as distinguished from a solid or compacted and impervious mass and the moisture coating of the particles is thereby effected at the place and moment when most needed for its disintegrating and safety influence as the filler falls or slides onto the extra hot bottom plate. The free gravity flow and open condition with a falling away tendency at the bottom, (as distinguished from a down-pressing and forcing from the top downward and hence most compressed and resistant at the bottom), has a most favorable influence in aid of the speed, safety and economy secured. This so facilitates the steam penetration, quick softening and rapid use that a greater concentration and application of heat and of steam is possible and practicable. At one side and above the delivery basin I mount a superheating roll to perform the same office as in the Patents Nos. 808,224 and 808,227 above mentioned.

In the drawings, illustrating a preferred embodiment of my invention—

Fig. 1 is a central, vertical section of the machine showing one of the flues in side elevation;

Fig. 2 is sectional detail of a modification;

Figure 4:
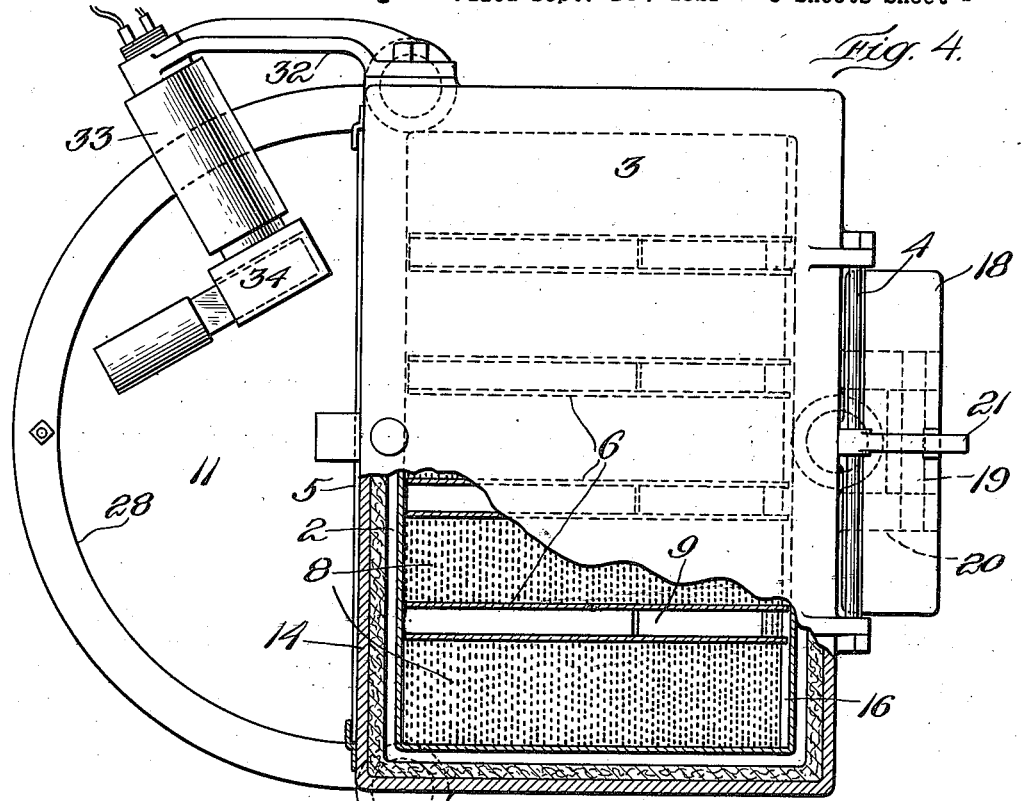
Fig. 4 is a top plan view partly broken away to show the interior.
Figure 3:
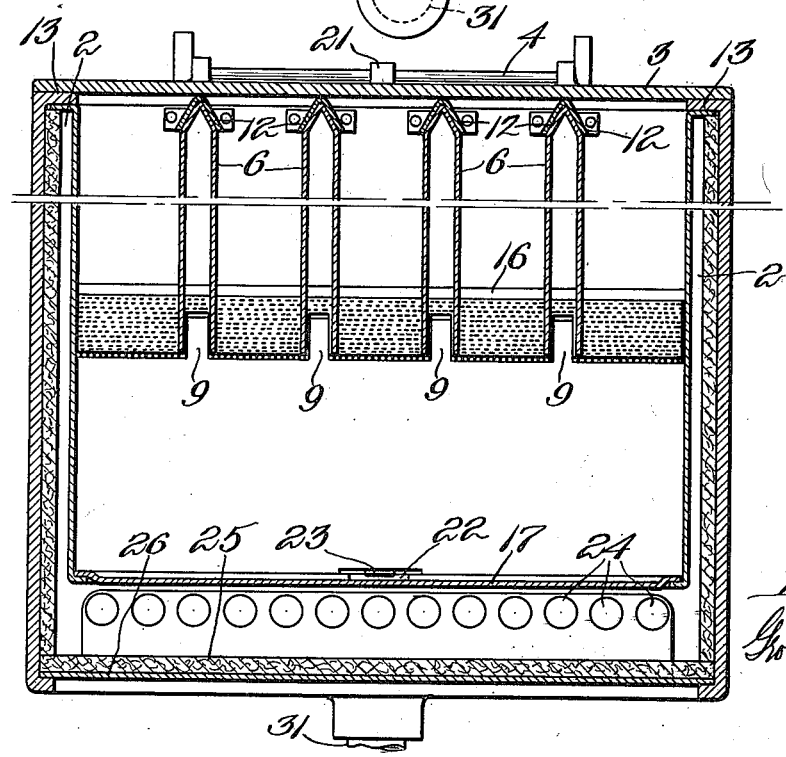
Fig. 3 is a section on the line 3—3 Fig. 1.
Figure 5:
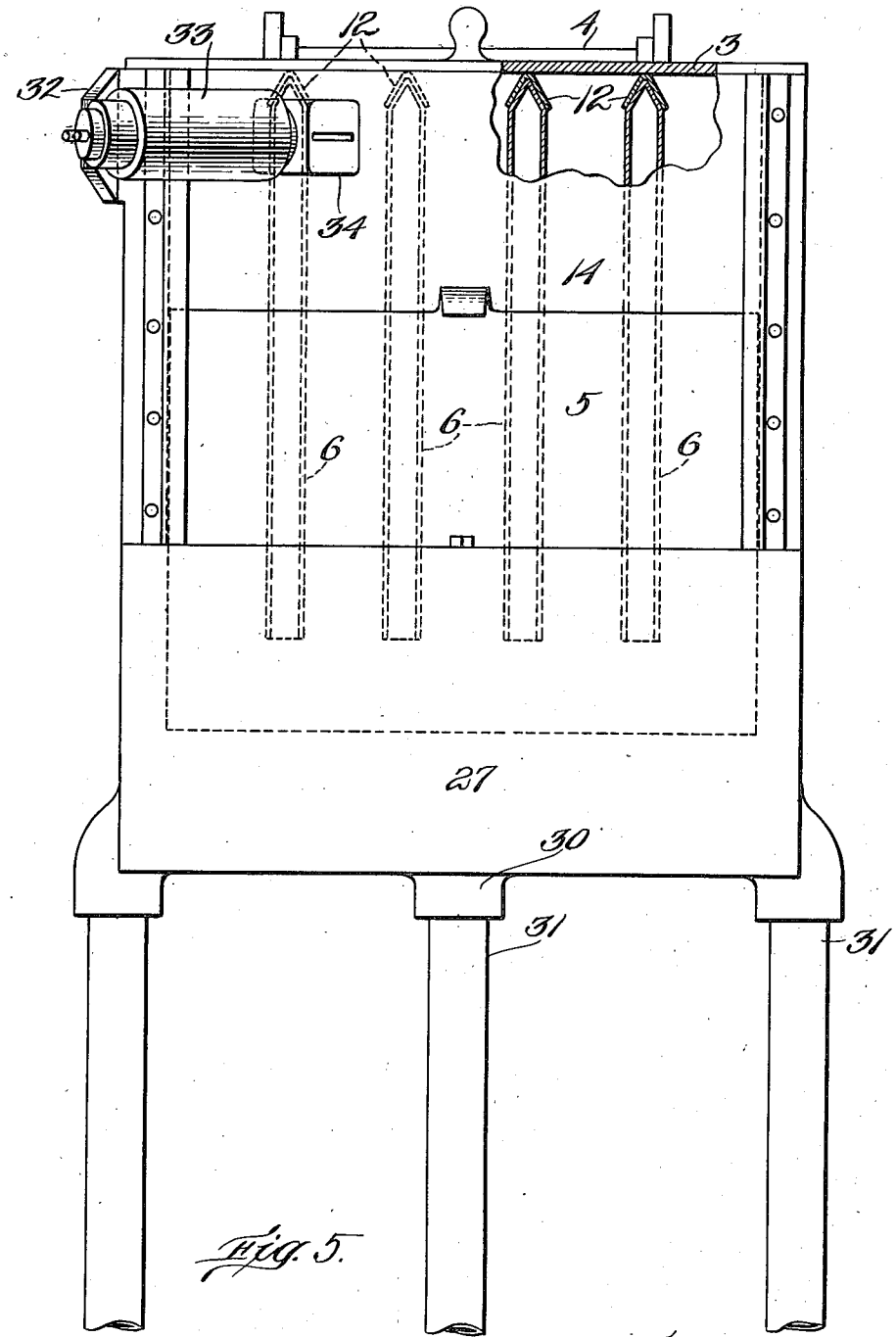
Fig. 5 is a view in front elevation.

My invention is capable of a wide variety of embodiments but for convenience of presentation herein is shown in a simple form of apparatus. The main receiving chamber or filler supply reservoir 1 is preferably provided with a double wall to afford a dead-air space 2, or surrounding jacket to hold in the heat, and has a cover 3 hinged at 4 for admitting the filler to the chamber, a slide door 5 at the front giving the operative access to the filler at the bottom. Within the chamber are several heat flues or radiators 6, four being shown, which preferably extend from front to rear and are more or less thin or knife-edged at their tops to prevent the filler lodging thereon, said radiators 6 being imperforate throughout their upper areas so as to radiate dry, radiant heat but not steam in a corresponding plurality of different ramifying courses, thereby compelling the steam to escape therefrom at their lower ends, if open, or their perforated sides 7 rather than the upper portions. This delivery of the hot steam directly into the lower part of the mass of the filler, i. e. the part which is to be used first applies therefore to the filler in said lower part the strongest or hottest heat (and yet safest heat, because moist) and this promotes looseness or tendency of the bottom filler to fall downward or forward away from the impending mass above, thereby keeping the open moisture-and-heat-receptive condition above and tending to prevent the solid heavy compacting together of the melting portions. As the steam percolates in following the openings or planes of least resistance and the cleavages in and through the filler mass its heat is taken up gradually or progressively by the filler. In other words this arrangement maintains the moisture at a higher heat in the lower part of the mass than elsewhere and does so automatically and continuously. The point of steam attack combined with the gravity loosening and opening influence facilitates the rapidity of steam penetration and effects the temperature control noted, and on the other hand the variant heat application from the bottom upward brings about largely the gravity loosening and opening influence while the moisture constitutes the safety element and speeds up the process in various ways presently pointed out in more detail. A bottom plate 8, preferably perforated throughout most of its area, supports the filler and transmits the vapor and heat through its perforations, the latter being small except at the flues or radiators 6 so that the filler does not pass through and yet the steam does pass through. This continuous passing of the steam maintains the upper surface of the bottom plate 8 wet or lubricated so that the movement of the filler is facilitated as the latter is melted or softened to a semi-fluid condition ready for use. The flues 6 have open lower ends secured in and opening through other perforations in this bottom plate as indicated at 9 but are preferably closed, especially when the sides 7 are perforated, at their lower ends from said bottom to the front to prevent filler accidentally getting through the openings 9 and down into the part beneath. The rear portion of said bottom plate 8, between the flues 6, is preferably inclined upward and rearwardly at 10 to aid in the natural discharge of the filler toward the front. At the front a delivery basin, work basin, or bottom extension 11 is provided from which the workman lifts the hot filler with his heated spatula as explained in Patent 808,224. The bottom of said basin 11 preferably inclines slightly downward toward the rear, so that any excess of moisture may flow down through the perforations of the plate 8 and so that no water may settle or be present on the bottom of said basin. Preferably the plate 8 and flues 6 connected therewith, are inserted from the bottom into the receiving chamber 1, and A-shaped caps or braces 12 permanently fastened across the top of said chamber, receive the top-ends of the flues 6 and thereby protect the flues, position the parts and prevent unauthorized tampering. A flange 13 on the outer jacket or casing 14 performs the same office for the inner wall or enclosure of the chamber 1, so that the latter and the basin 11 are removable only downward. The bottom plate 8 is held at its lower front edge by a groove or beneath a flange 15 (which also protects it against injury by the operative when he pokes or pulls heated filler forward with his knife or spatula) and is held at its upper rear edge by a groove or flange 16.

Beneath the plate 8 is a water container or steam producer of any suitable construction, shown herein as a basin or receptacle 17 made shallow in order to facilitate quick production of steam or hot vapor, and this has an automatic sealing connection with a water supply tank 18 conveniently mounted at the rear, as on pivots 19 of brackets 20 and held upright by a latch 21 and connecting by a water-pipe terminating in an enlarged end to constitute an automatically sealing extension 22 in which its outlet 23 dips or seals. The plate containing the water basin 17 may either snap into the groove 15 or extend co-extensive of the delivery basin or extension 11. The latter construction provides a steam jacket for the filler delivery basin, desirable when a very high-degree heater is employed. The former construction is preferable when a milder heat supply is used, so that it becomes safe to employ dry, direct heat beneath the basin 11. To still further safeguard the filler in the basin 11 against burning or injury through carelessness I restrict the heating units to the rear of the apparatus.

As herein shown, I provide an electric heating unit 24 immediately beneath the water pan or basin 17 enclosed in a dry heating chamber beneath the moist heating chamber above. This combination of the electric heating unit with the steam generator immediately above it acts to economize and save the unit and gives greater efficiency as the water and resulting steam take up the heat away from the unit and carry said heat through the filler mass at once. This construction prevents dangerous building up of heat at the unit which might otherwise quickly destroy the unit. The water and steam are continually changing or renewing, and constitute one form of automatic safety control or regulator. The higher the heat, the more steam and hence the greater heat conduction away from the heater, and this heat conduction is pervasive to all parts and carries the heat dissemination throughout the mass. Wherever the steam penetrates and percolates, it is just to that extent drawing off and carrying away the heat from the unit 24, so that localized overheating (even in the unit itself) is prevented liability of burning the filler is minimized and extreme rapidity of melting the filler is accomplished. Great uniformity of procedure and results is assured, this also being one chief aim of the invention. The unit 24 rests on an asbestos or cement base 25 on a removable supporting plate 26 carried by a frame casting 27. This casting extends upwardly around the parts mentioned and has inturned or flanged upper edges 28 fitting tightly against, and preferably slightly overhanging, the top edge of the delivery basin 11 so as to constitute a hot air jacket for all the parts within. This casting is preferably lined with asbestos or other heat insulator so as to conserve the heat and protect the operative. The jacket or casing 14 is preferably a casting and may be formed integrally with the casting 27 and this also preferably has a similar lining, so that practically the whole machine has an asbestos lining 29. The casting 27 has leg sockets 30 for the legs 31, and a bracket 32 supports a roll 33 and knife block 34 (see Patent 808,227 above mentioned) also electrically heated.

In use, the operative turns back the cover 3 and dumps the fragmentary pieces of filler into the compartments between the flues or radiators 6 until the filler supply chamber 1 is entirely filled, the slide door 5 being down, and then turns down the cover 3 which closes the reservoir or supply chamber tightly. He then turns on the electricity and the unit 24 rapidly vaporizes the water in the basin 17 which rises through the foraminous bottom 8 i. e., through the openings 9 and thence out through the perforations, 7, and also through the small perforations in said bottom 8 when so made, and because of the open, loose character of the filler mass the steam percolates readily up through the mass carrying the heat quickly and intimately to every particle of the filler, this effect of the steam being increased at the lower front portion of the filler mass by the steam passing from the flues or radiators 6 out at or adjacent the lower ends, as through the holes 7 therein. The steam instantly fills the several flues entering through the open ends 9 thereof so that this heat is radiated as dry heat from the upper ends of the flues into the filler mass here and there wherever the flues are located. In other words, the flues serve the three purposes of first, parting the filler mass or holding it apart so as to provide the heat-receiving openings, second, radiating a melting heat against and instantly throughout the whole length of the vertical walls or areas of said openings or parted places, and, third, delivering steam directly into the filler mass at their lower ends. Of course the upper ends of these flues and in fact the entire area of the flues may be perforated to deliver moist heat or steam but I prefer not to perforate them excepting at a restricted portion of their lower ends as indicated because the steam would otherwise tend to escape more rapidly into the upper portion of the chamber than is desirable. It is desirable that the lower portion of the filler mass shall be melted first,—where it is to be used and also so that it shall tend more readily to drop away from the impending mass above. In fact one chief feature of my invention is to make the filler mass disintegrate downward and forward away from the bottom, i. e., drop down particle by particle, one small chunk after another, rather than to be melted simultaneously all over and especially at the top which would tend to cause the upper portion to pack down upon the lower portion, which is especially objectionable in this kind of a filler, containing a preponderating amount of heat—insulating material, as first mentioned. The preferred construction explained produces the most rapid results. At the same time that the steam is doing its work of melting and disintegrating the filler mass as explained, the dry heat from the unit 24 is filling the chamber around the basin 11 and is also filling all the space 2 around the outside of the reservoir 1 (which is preferably imperforate and therefore radiates dry heat into the filler or burning out the unit 24 (because of the automatic control of the heat withdrawal of the water and steam as already explained), whether said space 2 contains dry heat or steam) thereby cooperating with the flues or radiators 6 to maintain maximum melting efficiency. As the steam from the shallow pan or basin 17 rises, more water automatically takes the place of that which has evaporated, flowing automatically in well known manner from the tank 18 at its outlet 23 into the sealing cup or extension 22 from the pan 17. In this way I have found that a considerable heat may be employed so as to render the progress of the melting very rapid without any danger of burning or charring and injuring the filler. The dry, hot chamber is so located and constructed as to attack the filler with its harsher heat after the filler has been all coated with a film of moisture by the steam, and this hot, dry, radiant heat is also brought to bear on the filler around the work basin 11, (and this may be in addition to the more uniform heat of a steam jacket, see Fig. 2) where it is desirable to keep the filler in its most highly melted condition for instant application to the shoe bottom. My process and machine make the rapid or forced, high-speed use of this kind of filler safe and fool proof as the steam sets the safe limit and makes it practically impossible to get too high a heat—because the moisture surrounding the particles of filler acts to protect the filler against destructive heat in the normal progress of the shoe filling process. The main object and chief distinguishing feature of my apparatus and process is the injection of heat and moisture into and within the body or mass of the loose filler. Preferably the heat is driven or forced along with the moisture in the form of percolating steam. This takes place vertically from and through the bottom and laterally (i. e. in other directions than vertical) from and through the flue or flues. Preferably the means for hastening the melting or softening of the fragmentary or loose filler mass combines both the radiator feature and the flue feature in one and the same element, although the radiator may simply transmit the heat without any actual flow, while the term flue means more properly a part which transmits the steam or hot air as a flowing current. Any construction or part, therefore, which transmits the steam or hot air as a flowing current, delivered therefrom or thereby into the filler mass is a flue within the meaning of this definition. The term radiator is broad or generic to mean a part from which emanates heat of any kind, which radiates heat (dry or moist), which introduces either dry heat or steam within the filler mass (above the bottom), whereas the term flue is not so broad or generic, but is limited to that species of radiator which is hollow and capable of conveying a current of flowing heat laterally into or within the filler mass, (and also above the bottom).

The operator having started his apparatus as above explained and gotten the morning's supply of filler melted, slides up the door 5, thereby letting the filler pour out into the work basin 11 ready for use. The free movement of the filler is facilitated by its own slippery condition (wet with steam condensation) and by the slippery surface or wet and steam lubricated surface of the bottom plate 8 and by the inclined rear end 10 of said bottom plate and by the construction and process which insure the dropping away of the almost fluid subjacent lumps or particles from the mass above, thereby aiding in maintaining the open, loose, non-compacted condition and tendency. Also the open space formed by the cutaway, overhanging and under-cut front, lower ends of the flues 6 makes it convenient for the operator to poke the filler out with his knife or spatula provided it should not fall freely enough to suit him or whenever he needs a fresh supply quickly. Having filled a shoe bottom in the usual manner he superheats it and presses it into the shoe bottom by the roll 33 in well known manner.

This application is one of several concurrent and copending applications which together constitute a new system of handling and using shoe filler for and in connection with shoe manufacture. My application Serial No. 500,709 covers the process of using the shoe-bottom filler of the present application Serial No. 584,879 covers the method of making said article and covers said filler as an article of manufacture; and Serial No. 500,711 covers the apparatus for forming said filler; while the preferred type of filler (and method of making) best adapted to all the foregoing is covered in Patents Nos. 1,032,312, and 1,121,688, the broad process of using in Patents Nos. 1,118,161, and 1,227,502, and the machine for using (considered broadly in certain respects) in Patent No. 1,225,372.

As before intimated my invention is capable of a wide variety of changes in its embodiment without departing from the spirit and scope of the invention which is further defined in the following claims. It will be noted that some of these claims embrace fewer elements and details than others, as various subcombinations are capable of use separate from the entire combination.

Claims:—

1. Apparatus for preparing shoe-bottom filler for application to shoe bottoms, comprising a reservoir adapted to the rapid handling at high heat of a mass of heat-responsive, sticky filler which is normally slowly penetrative by heat and liable to burn at high heat, and mechanism cooperative with said reservoir for enveloping said mass and also at the same time sub-divisions or portions of the mass with heat and moisture in order to reduce the filler mass rapidly and with safety to a semi-fluid or working condition, all constructed and arranged to cause the filler to loosen bottomward and tend to disintegrate downward as distinguished from solidifying and compacting at the bottom.

2. Apparatus for preparing shoe-bottom filler for application to shoe bottoms, comprising a reservoir adapted to the rapid handling at high heat of a mass of heat-responsive, sticky filler which is normally slowly penetrative by heat and liable to burn at high heat, and mechanism cooperative with said reservoir for enveloping said mass and also at the same time sub-divisions or portions of the mass with heat and moisture in order to reduce the filler mass rapidly and with safety to a semi-fluid or working condition, said mechanism including means arranged to maintain the moisture at a higher heat in the lower part of the mass, i. e. the part which is to be used first, than elsewhere therein, so that in the softening disintegration of the filler mass the filler is caused to move or loosen and tend to drop away from the impending mass above for application to the shoe-bottoms.

3. Apparatus for preparing shoe-bottom filler for application to shoe bottoms, comprising a reservoir adapted to the rapid handling at high heat of a mass of heat-responsive, sticky filler which is normally slowly penetrative by heat and liable to burn at high heat, and mechanism cooperative with said reservoir for enveloping said mass and also at the same time sub-divisions or portions of the mass with heat and moisture in order to reduce the filler mass rapidly and with safety to a semi-fluid or working condition, said mechanism including means to deliver steam directly into the lower part of the mass, i. e. the part which is to be used first, and so as to cause the filler to move or loosen and tend to drop away from the impending mass above for application to the shoe-bottoms.

4. Apparatus for preparing shoe-bottom filler for application to shoe bottoms, comprising a reservoir adapted to the rapid handling at high heat of a mass of heat-responsive, sticky filler which is normally slowly penetrative by heat and liable to burn at high heat, and mechanism cooperative with said reservoir for enveloping said mass and also at the same time sub-divisions or portions of the mass with heat and moisture in order to reduce the filler mass rapidly and with safety to a semi-fluid or working condition, said mechanism including means to convey radiant dry heat into the interior of the mass in different ramifying courses and regions, and said mechanism also including means to deliver steam directly into the lower part of the mass, i. e. the part which is to be used first, and so as to cause the filler to move or loosen and tend to drop away from the impending mass above for application to the shoe-bottoms.

5. In a shoe bottom filling machine for the rapid handling with high heat of a heat-responsive, sticky filler which is normally slowly penetrative by heat and liable to burn at high heat, the combination with a filler supply reservoir constructed and arranged to hold the filler mass parted with a plurality of heat-receiving openings extending vertically in the mass for simultaneously receiving a melting heat throughout their vertical walls, said reservoir being adapted to hold and maintain for delivery filler of said character in a loose, open, non-compressed and non-compacted condition, of means for delivering a melting heat simultaneously to the bottom end of the mass of said filler and to said vertical walls and parted regions of the filler within said mass.

6. In a shoe-bottom filling machine for the rapid handling with high heat of a heat-responsive, sticky filler which is normally slowly penetrative by heat and liable to burn at high heat, the combination with a filler supply reservoir constructed and arranged to hold the filler mass parted with a plurality of heat-receiving openings extending vertically in the mass for simultaneously receiving a melting heat throughout their vertical walls, said reservoir being adapted to hold and maintain for delivery filler of said character in a loose, open, non-compressed and non-compacted condition, of means for delivering a melting heat simultaneously to the bottom end of the mass of said filler and to said vertical walls and parted regions of the filler within said mass, including steam at said bottom end.

7. An apparatus of the kind described, having a delivery portion from which the filler is applied to the shoe bottom, and a filler-supply reservoir provided with a plurality of upstanding heating radiators set sufficiently closely together to require the filler to be in relatively small fragments or segregated portions, combined with heating means arranged to maintain heat radiating from said radiators in and throughout the mass of the filler in said reservoir.

8. An apparatus of the kind described, having a delivery portion from which the filler is applied to the shoe-bottom, and a filler-supply reservoir divided into a plurality of vertical filler holding compartments of a size to require the filler to be separated in relatively small portions and including a hollow vertical partition in the form of a melting radiator extending within the reservoir in position, shape and area to extend within and separate the mass of filler in the reservoir into segregated portions, and means for introducing a melting heat into said vertical radiator.

9. An apparatus of the kind described, having a delivery portion from which the filler is applied to the shoe bottom, and a filler-supply reservoir provided with a plurality of upstanding heating flues set sufficiently closely together to require the filler to be in relatively small fragments or segregated portions, combined with heating means arranged to maintain heat radiating from said flues in and throughout the mass of the filler in said reservoir and means for driving moisture along with said heat.

10. An apparatus of the kind described, having a delivery portion from which the filler is applied to the shoe bottom, and a filler-supply reservoir provided with a plurality of upstanding heating flues or radiators set sufficiently closely together to require the filler to be in relatively small fragments or segregated portions, combined with heating means arranged to maintain heat radiating from said flues in and throughout the mass of the filler in said reservoir combined with means for supplying and driving steam into said flues and said flues having openings for the flow of the steam out into said filler.

11. An apparatus of the kind described, having a delivery portion from which the filler is applied to the shoe bottom, and a filler-supply reservoir provided with a plurality of upstanding heating radiators set sufficiently closely together to require the filler to be in relatively small fragments or segregated portions, combined with heating means arranged to maintain heat radiating from said radiators in and throughout the mass of the filler in said reservoir and means for delivering steam into that portion of the reservoir which is adjacent to the delivery portion of the apparatus in such manner as especially to heat the filler more rapidly just as it is about to pass from the reservoir into the delivery portion.

12. A shoe-bottom filling machine, for the rapid handling of granular, sticky filler, normally solid and impervious to quick heat penetration but capable of being softened and sluggishly melted by heat and then quick setting when allowed to cool in the shoe-bottom, comprising filler supplying and delivering mechanism having means and metal supporting construction for maintaining a mass of said filler in loose and open, non-compacted condition and with a tendency for its particles to drop away from each other and become increasingly loose and open at and near the bottom as distinguished from being compacted or increasingly dense thereat, said means for so maintaining the filler including heating means for subjecting said filler to the concerted action of radiant heat and steam and maintaining the action of the latter extra active among the loose particles throughout the entire lower end of the mass to prevent burning in contact with the adjacent metal and to promote the dropping and free opening movement of the filler.

13. Apparatus for preparing shoe-bottom filler for application to shoe bottoms, comprising a reservoir adapted to the rapid handling at high heat of a mass of heat-responsive, sticky filler which is normally slowly penetrative by heat and liable to burn at high heat, and softening means in communication with said filler in said reservoir for reducing the filler to a sluggishly fluid working condition, said softening means including steam producing mechanism, a cooperating automatic water supply for maintaining the steam producing mechanism supplied automatically with the necessary water for its steam production, and steam delivering connection from said producing mechanism into said reservoir for heating and moistening the contained filler with said steam.

14. Apparatus for preparing shoe-bottom filler for application to shoe bottoms, comprising a reservoir adapted to the rapid handling at high heat of a mass of heat-responsive, sticky filler composed of finely granulated cork enveloped in a binder and normally slowly penetrative by heat and liable to burn at high heat, and softening means for reducing said filler to a sluggishly fluid working condition, said softening means including a water container for generating steam and delivering said steam into said filler, heating means for converting said water into said steam, and an automatically controlled water supply for supplying said container automatically with the water required in accordance with the heat, all constructed and arranged to maintain the filler workable and sluggishly plastic or united and homogeneous and sticky so as to be right for the filling operation and not free flowing or separated or dried.

15. A shoe-bottom filling machine, for the rapid handling of granular, sticky filler, normally solid and impervious to quick heat penetration but capable of being softened and sluggishly melted by heat and then quick setting when allowed to cool in the shoe-bottom, comprising filler supplying and delivering mechanism having means and metal supporting construction for maintaining a mass of said filler in loose and open, non-compacted condition and with a tendency for its particles to drop away from each other and become increasingly loose and open at and near the bottom as distinguished from being compacted or increasingly dense thereat, said means for so maintaining the filler including heating means for subjecting said filler to the concerted action of radiant heat and steam and maintaining the action of the latter extra active among the loose particles throughout the entire lower end of the mass to prevent burning in contact with the adjacent metal and also for maintaining the steam extra active at the front lower end to promote the dropping and free opening movement of the filler, and a heated work basin opening from said front lower end in relation to receive said steamed filler in said open condition.

16. An apparatus of the kind described, comprising a reservoir to hold and soften for use shoe-bottom filler of the kind described constructed and arranged to deliver filler by gravity and falling disintegration as distinguished from forced downward pressure, a work-basin opening therefrom in relation to receive the filler in loose open condition, said reservoir having a bottom through which steam may pass into the lower end of the mass of filler in the reservoir, and a source of said steam supply below said bottom including an electric heating unit and a combined water supply and steam producer arranged to receive the full direct heat from said unit and convey it throughout the mass of filler in the reservoir in the form of steam, thereby minimizing the danger of burning the filler on said bottom and burning out the unit.

17. An apparatus of the kind described, comprising a reservoir to hold and soften for use shoe-bottom filler of the kind described, said reservoir having a bottom through which steam may pass into said filler, and a source of steam supply below said bottom including an electric heating unit and a combined water supply and steam producer arranged to receive the full direct heat from said unit and drive it in the form of steam up through said bottom into and throughout the filler above said bottom thereby quickening the heat penetration of the filler and minimizing the danger of burning the filler.

18. An apparatus of the kind described, comprising a reservoir to hold and soften a mass of shoe-bottom filler of the kind described, a work-basin opening therefrom to receive the softened filler, and heating means for moistening and softening the filler in said reservoir, said reservoir containing means for closing in the heat over and around the mass of filler in the reservoir, and having construction and relation to said basin for maintaining a loose open delivery of filler to said basin by gravity and disintegration as distinguished from forced delivery, and said heating means and the aforesaid parts having and including cooperating water supply and steam producing means for automatically varying the rapidity and volume of steam production as the heat varies and thereby minimizing the danger of burning the filler.

19. An apparatus of the kind described, comprising a water chamber for hot water, a filler basin and receptacle above said chamber adapted for containing and retaining a mass of shoe-bottom filler of the kind described in a softened, plastic condition for removal from the top and front of said basin, means in the rear of said basin communicating with said water chamber for conveying heat and steam from the latter up into the mass of the filler at a plurality of points within the filler to soften and maintain the filler plastic, and means for closing in the heat over the filler in said receptacle while leaving the front open for access to the filler for use.

20. An apparatus of the kind described, comprising a reservoir to hold and soften the filler, a work basin opening therefrom to receive the filler, a water basin and heating unit for generating steam, and a bottom through which said steam may pass into the filler in said reservoir.

21. An apparatus of the kind described, comprising a reservoir and its bottom to hold and soften shoe-bottom filler of the kind described, a work-basin opening therefrom to receive the filler, an electric heating unit, a water basin or container immediately above said unit constructed and positioned to receive the full direct heat therefrom and convey it throughout the mass of filler in the reservoir in the form of steam, and means for affording said steam and heat access to the filler and to all parts of the apparatus.

22. An apparatus of the kind described, comprising a reservoir to hold and soften the filler, a work basin opening therefrom to receive the filler, a water basin and heating unit for generating steam, and a bottom through which said steam may pass into the filler in said reservoir, said reservoir having heat radiating flues opening toward said water basin to receive said steam.

23. In an apparatus of the kind described, a reservoir divided into a plurality of vertical compartments adapted to hold and soften shoe-bottom filler of the kind described, said compartments being of a size to require the filler to be separated in relatively small portions, said reservoir having a partition in the form of a flue arranged to transmit steam to percolate through the filler, means for maintaining a supply of steam flowing in and from said flue, and a work basin located to receive the melted filler from the bottom of the mass in the reservoir, all constructed and arranged so as to permit the filler to remain open and free to receive the steam and to settle and drop from the bottom of the mass by gravity and disintegration.

24. In an apparatus of the kind described, a reservoir divided into a plurality of vertical compartments adapted to hold and soften shoe-bottom filler of the kind described, said compartments being of a size to require the filler to be separated in relatively small portions, said reservoir having a partition in the form of a flue arranged to transmit steam to percolate through the filler, means for maintaining an automatically controlled supply of steam flowing in and from said flue, and a work basin located to receive the melted filler from the bottom of the mass in the reservoir, all constructed and arranged so as to permit the filler to remain open and free to receive the steam and to settle and drop from the bottom of the mass by gravity and disintegration.

25. In an apparatus of the kind described, a reservoir to hold and soften shoe-bottom filler of the kind described, means for maintaining a melting heat within the filler, a filler delivery portion adjacent the bottom of the reservoir for delivering filler from the latter for application to a shoe-bottom, said portion including a bottom plate to receive the melted filler from the bottom of the mass in the reservoir, and means for maintaining the upper surface of said plate moisture-lubricated to facilitate the sliding movement of the softened filler.

26. In an apparatus of the kind described, a reservoir to hold and soften shoe-bottom filler of the kind described, means for maintaining a melting heat within the filler, a filler delivery portion adjacent the bottom of the reservoir for delivering filler from the latter for application to a shoe-bottom, said portion including an inclined bottom plate to receive the melted filler from the bottom of the mass in the reservoir, and means for maintaining the upper surface of said plate moisture-lubricated to facilitate the sliding movement of the softened filler.

27. In an apparatus of the kind described, a reservoir to hold and soften shoe-bottom filler of the kind described, means for maintaining a melting heat within the filler, a filler delivery portion adjacent the bottom of the reservoir for delivering filler from the latter for application to a shoe-bottom, said portion including an inclined perforated bottom plate to receive the melted filler from the bottom of the mass in the reservoir, and steam supply means for delivering steam through the perforations and maintaining the upper surface of the plate moisture-lubricated to facilitate the sliding movement of the softened filler.

28. In an apparatus of the kind described, a reservoir to hold and soften shoe-bottom filler of the kind described, and including a flue arranged to transmit steam to percolate through the filler within the reservoir, means for maintaining a supply of steam flowing in and from said flue, and a work basin located to receive the melted filler from the bottom of the mass in the reservoir, said basin having its bottom inclined toward the rear to carry excess moisture back away from the working end of the basin.

29. An apparatus of the kind described, comprising a filler-supply reservoir, flues in the form of double walls extending from near the bottom of the reservoir to the top thereof and from one side to the other so as to constitute a plurality of compartments for holding segregated portions of the filler, means for maintaining heat within said flues and for driving steam heat into the segregated portions of filler in said several compartments, and a filler delivery portion adjacent the bottom of said reservoir for delivering the filler from the latter for application to a shoe bottom.

30. An apparatus of the kind described, comprising a filler-supply reservoir, hollow partitions closed at their upper ends dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, and steam delivering means beneath said reservoir for delivering steam into said hollow partitions and through said bottom.

31. An apparatus of the kind described, comprising a filler-supply reservoir, hollow partitions closed at their upper ends and having openings at their lower ends and dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, said partitions being closed, except at said openings, to prevent the entrance thereinto of filler from the compartments.

32. An apparatus of the kind described, comprising a filler-supply reservoir, hollow partitions closed at their upper ends dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, said partitions being closed, except at said openings, to prevent the entrance thereinto of filler from the compartments and having fine openings adjacent their lower ends to permit the outflow of steam into the filler but incapable of admitting the filler.

33. An apparatus of the kind described, comprising a filler-supply reservoir, hollow partitions closed at their upper ends dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, a shallow water-container and steam-generator beneath said bottom opening into said flues and reservoir, means for supplying water thereto, and a heating unit beneath said water-container and steam-generator.

34. An apparatus of the kind described, comprising a filler-supply reservoir, hollow partitions closed at their upper ends dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, a shallow water-container and steam-generator beneath said bottom opening into said flues and reservoir, means for supplying water thereto, and a heating unit and heating chamber beneath said water-container and steam-generator, said chamber enclosing the work-basin to form a heating jacket therefor.

35. An apparatus of the kind described, comprising a filler-supply reservoir, hollow partitions closed at their upper ends dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, a shallow water-container and steam-generator beneath said bottom opening into said flues and reservoir, means for supplying water thereto, and a heating unit and heating chamber beneath said water-container and steam-generator, said chamber enclosing the work-basin and also the reservoir to form a heating jacket therefor.

36. An apparatus of the kind described, comprising a filler-supply reservoir, hollow partitions closed at their upper ends dividing said reservoir into a plurality of vertical compartments, a bottom at the lower end of said reservoir extending between said partitions, the latter opening through said bottom at the rear part of the reservoir and terminating above said bottom at the front part of said reservoir to provide a free space for the filler from said several compartments to come together in, a work-basin opening from said space for receiving the filler therefrom, a shallow water-container and steam-generator beneath said bottom opening into said flues and reservoir, automatic means for maintaining a continuous supply of water to said water-container and steam-generator, and a heating unit beneath said water-container and steam-generator.

37. In an apparatus of the kind described, a reservoir for supplying shoe-bottom filler, means for subjecting the filler in said reservoir to continuous heat and moisture, a dry hot work-basin for receiving the hot moist filler from said reservoir, and means for maintaining said work-basin hot, the aforesaid mechanism including construction and provision for preventing the settling or presence of water in said basin and for maintaining said work-basin substantially dry.

38. In an apparatus of the kind described, a reservoir divided into a plurality of vertical compartments adapted to hold and soften shoe-bottom filler of the kind described, said compartments being of a size to require the filler to be separated in relatively small portions, means for maintaining a supply of moist heat percolating through the filler in said compartments, and means for maintaining additional heat radiating laterally into and within the mass of said filler in the reservoir.

39. In an apparatus of the kind described, a reservoir divided into a plurality of vertical compartments adapted to hold and soften shoe-bottom filler of the kind described, said compartments being of a size to require the filler to be separated in relatively small portions, a work-basin for receiving filler from said compartments, means for maintaining a supply of moist heat percolating through the filler in said compartments, and means for maintaining additional heat radiating into said filler from the wall of the reservoir.

40. In an apparatus of the kind described, a filler reservoir, a bottom for supporting and delivering the filler, a flue upstanding from said bottom having an open lower portion so constructed and arranged as to permit the flow of heat therethrough into the adjacent filler but not the flow of filler in a reverse direction into the flue, a work basin for receiving the filler from said bottom, and means for causing a flow of heat in said flue and out through said open lower portion into the filler above said bottom.

41. In an apparatus of the kind described, a filler reservoir, a bottom for supporting and delivering the filler, a flue upstanding from the midst of said bottom and opening through said bottom, said flue having an open lower portion opening above the bottom into the filler so constructed and arranged as to permit the flow of steam therethrough from below said bottom into the adjacent filler but not the flow of filler in a reverse direction below the bottom, and a work basin for receiving the filler from said bottom, all the aforesaid mechanism being constructed and arranged to receive and handle shoe-bottom filler of the kind described, combined with means for causing a flow of steam from below said bottom into said flue and out through said open lower portion into the filler above said bottom.

42. In an apparatus of the kind described, a filler reservoir, a removable bottom, and a flue upstanding from the bottom, said bottom and flue being removable bottomward only.

43. In an apparatus of the kind described, a filler reservoir, a bottom, and a flue upstanding from the bottom, said reservoir having an A-shaped cap in fixed position to protect the top of said flue.

44. In an apparatus of the kind described, a filler reservoir, a removable bottom, and a flue upstanding from the bottom, said reservoir having an A-shaped cap in fixed position to protect the top of said flue, said bottom and flue being removable bottomward only.

45. In an apparatus of the kind described, a filler reservoir, a removable bottom, and a flue upstanding from the bottom, said bottom and flue being removable bottomward only, and said reservoir consisting of an inner chamber and an outer casing overlapped at their top end.

46. In an apparatus of the kind described, a reservoir consisting of an inner chamber and an outer casing flanged to overhang the top edge of the inner chamber, a work-basin, an enclosing member for the latter, a bottom for the reservoir, and a steam-basin, all arranged for removal from the reservoir downward only.

47. In an apparatus of the kind described, a reservoir for heating shoe-bottom filler of the kind described, a work-basin for receiving the filler therefrom, and said reservoir having a bottom removably engaging at its front edge a rear overhanging portion of the bottom of said basin to protect it against injury from the workman's spatula.

48. In an apparatus of the kind described, a reservoir for heating shoe-bottom filler of the kind described, a work-basin for receiving the filler therefrom, and said reservoir having a bottom removably engaging at its front edge a rear overhanging portion of the bottom of said basin to protect it against injury from the workman's spatula and at its rear edge removably engaging an adjacent overhanging part.

In testimony whereof, I have signed my name to this specification, in the presence of two subscribing witnesses.

GEORGE H. MAXWELL.

Witnesses:
ANDREW THOMA,
OLIVER D. HOGUE.